Oct. 18, 1949.  K. WILLIAMS  2,485,026

HAND BRAKE

Filed July 29, 1946  3 Sheets-Sheet 1

Inventor:
Keith Williams.
By George I. Haight
Atty.

Oct. 18, 1949.   K. WILLIAMS   2,485,026
HAND BRAKE

Filed July 29, 1946   3 Sheets-Sheet 2

Inventor:
Keith Williams.
By George I. Haight
Atty.

Oct. 18, 1949.  K. WILLIAMS  2,485,026
HAND BRAKE
Filed July 29, 1946  3 Sheets-Sheet 3
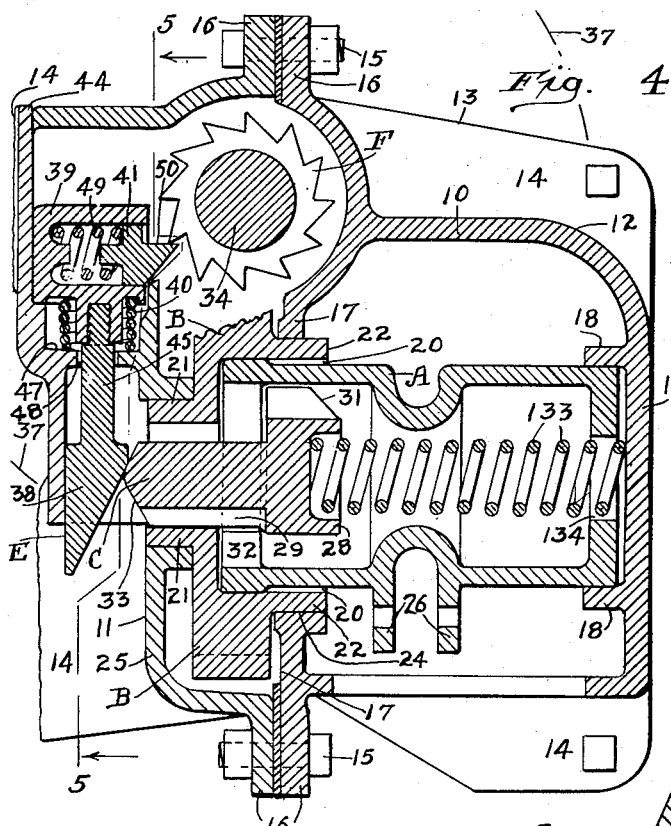
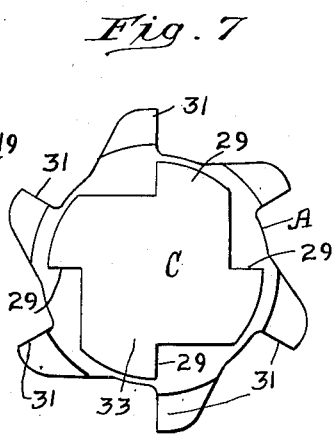
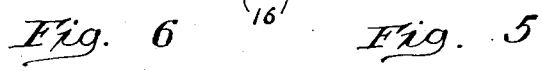
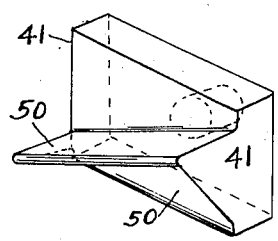
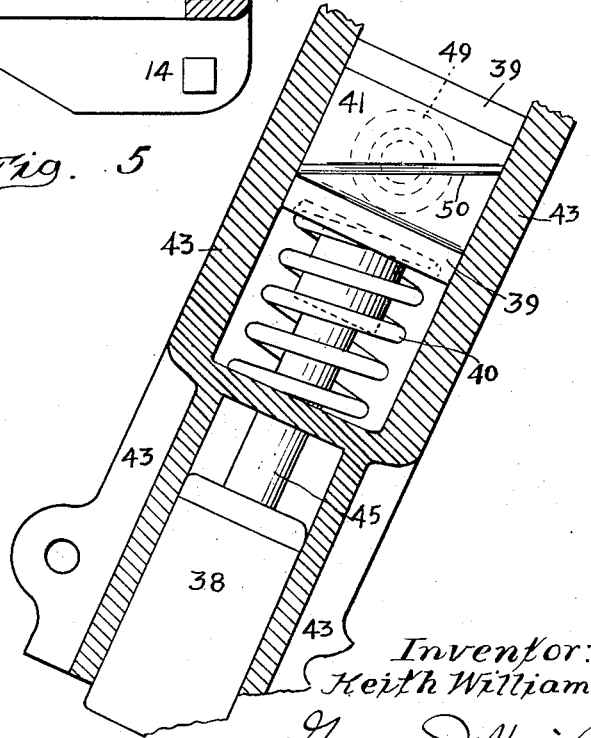
Inventor:
Keith Williams.
By George D. Haight
Attys.

Patented Oct. 18, 1949

2,485,026

UNITED STATES PATENT OFFICE 2,485,026

HAND BRAKE

Keith Williams, Buffalo, N. Y.

Application July 29, 1946, Serial No. 686,813

12 Claims. (Cl. 74—505)

This invention relates to improvements in hand brakes.

One object of the invention is to provide a hand brake mechanism for railway cars including a chain-winding drum; a driving member actuated by the usual hand wheel for rotating the drum; and a clutch operatively connecting the drum to the driving member, wherein quick release of the brakes is effected by disengaging the clutch through rotation of the hand wheel in brake-releasing direction, thereby breaking the connection between the driving member and drum, permitting unrestricted rotation of the latter.

A further object of the invention is to provide in a brake mechanism, as set forth in the preceding paragraph, simple and efficient means actuated by backward rotation of the hand wheel for positively actuating the clutch, comprising a movable cam element operated through rotation of the hand wheel for camming the clutch to disengaged position.

A still further object of the invention is to provide a hand brake mechanism of the character set forth wherein the quick release of the hand brake mechanism is effected by the hand wheel after a predetermined backing-off of the brakes, thus permitting the brakeman to ease off the brakes without complete release of the same.

Other objects of the invention will more clearly appear from the description and claims hereinafter following.

Figure 1:
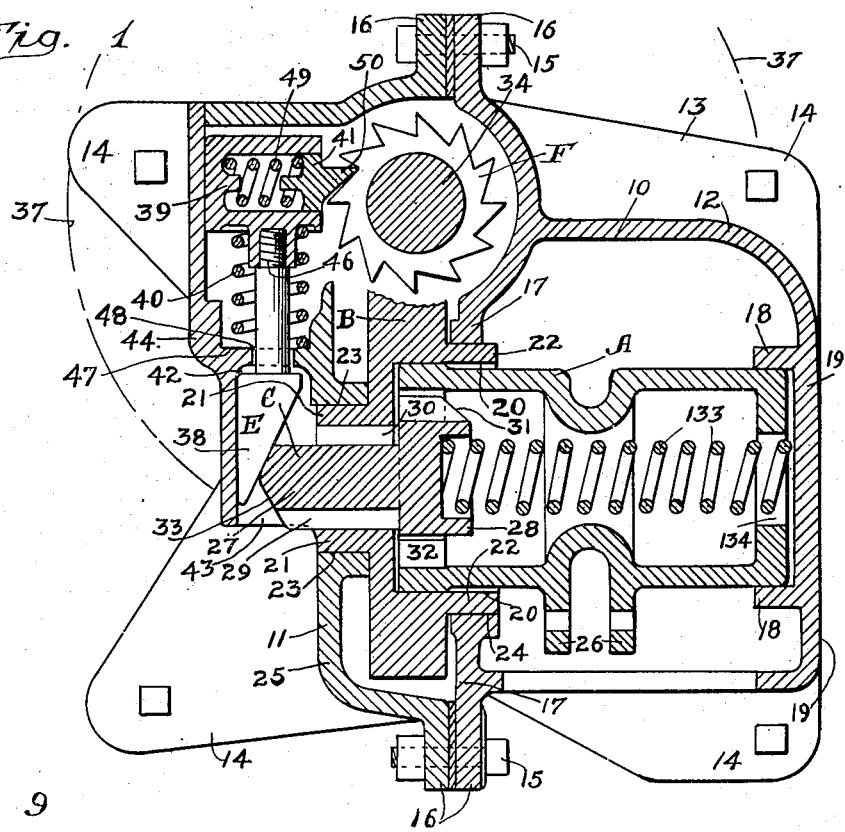
Figure 9:
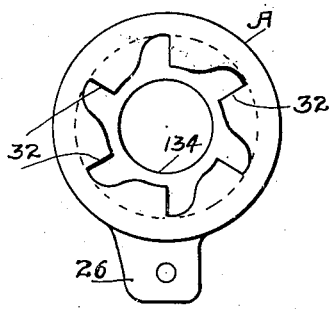
Figure 10:
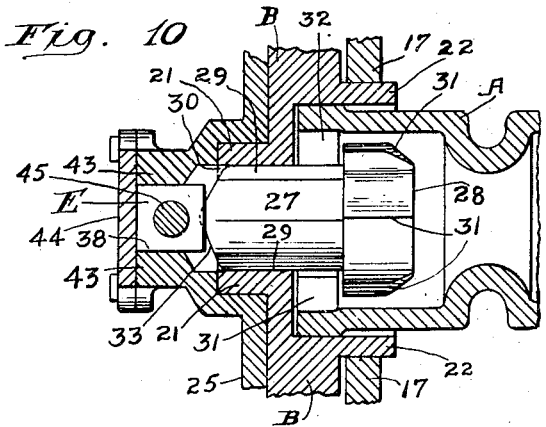
Figure 2:
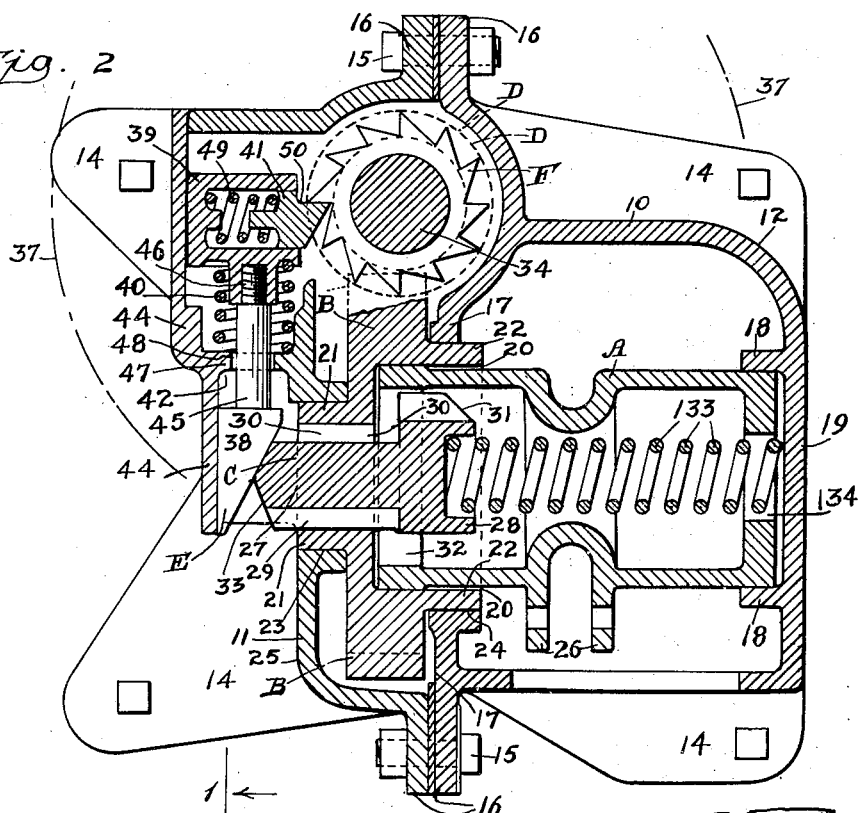
Figure 3:
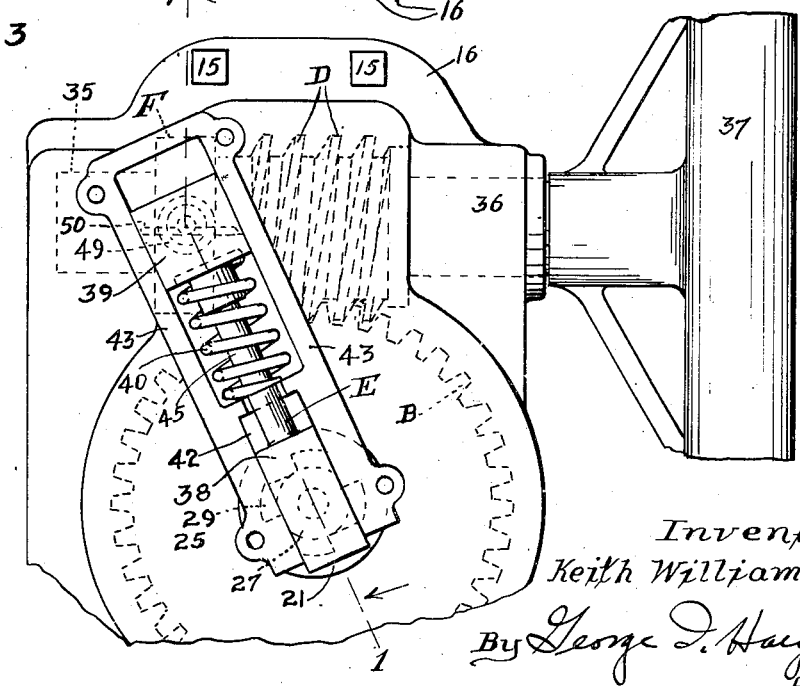

Referring to the drawings, Fig. 1 is a transverse, vertical, sectional view of my improved hand brake mechanism, corresponding substantially to the line 1—1 of Fig. 3; Fig. 2 is a view similar to Fig. 1, showing the parts in the position assumed when the clutch is partly disengaged; Fig. 3 is a side elevational view, looking from left to right in Fig. 2, with the cover plate of the guide chamber for the cam means removed; Fig. 4 is a view similar to Fig. 1, showing the parts in the position assumed when the clutch has been completely disengaged; Fig. 5 is a vertical, sectional view, on an enlarged scale, corresponding substantially to the line 5—5 of Fig. 4; Fig. 6 is a detail, perspective view of the latch member for the cam element; Fig. 7 is an end elevational view of the clutch member, looking from left to right in Fig. 1; Fig. 8 is a plan view of the cam element proper, detached from the other parts of the mechanism; Fig. 9 is an end elevational view of the chain-winding drum, looking from left to right in Fig. 1; Fig. 10 is a horizontal, sectional view of Fig. 4, partly broken away and corresponding to a line coincident with the axis of rotation of the chain-winding drum, showing the clutch member and the clutch-operating cam element in plan and the clutch spring omitted.

My improved hand brake mechanism, as shown in the drawings, comprises broadly a chain-winding drum A; a worm wheel B; a sliding, spring-resisted, clutch member C operatively connecting the drum to the worm wheel for rotation therewith; a hand wheel-actuated, worm element D, indicated in dotted lines in Figs. 2 and 3, engaging the worm wheel to rotate the latter; clutch-actuating cam means E for disengaging the clutch member to permit free rotation of the drum to effect quick release of the brakes; and a ratchet wheel F rotatable with the hand wheel and worm element for positively actuating the clutch member to disengaged position when the hand wheel is rotated in direction to release the brakes.

As is the usual practice, the working parts of my improved brake mechanism are preferably enclosed in a housing 10 which, as shown, is made up of two parts or sections 11 and 12 to facilitate assembling the mechanism. The two-part housing 10 is divided vertically in a plane at right angles to the axis of rotation of the chain-winding drum. Each part of the housing is in the form of a chamber, the chamber formed by the part or section 12 housing the chain-winding drum, and that formed by the part 11 housing the remaining parts of the mechanism. The back wall 13 of the housing, which is formed partly on each section thereof, is extended outwardly beyond the top, bottom, and sides of the housing proper to provide securing flanges 14 by which the housing is supported on the car, the flanges being provided with the usual openings for securing bolts or similar elements for fastening the housing to the end wall of the car. The sections 11 and 12 are secured together by bolts 15 extending through suitable flanges 16—16 on said sections. The two chambers of the housing formed by the sections 11 and 12 are separated by a wall 17, which extends transversely to the axis of rotation of the drum A.

The chain-winding drum A is in the form of a hollow, cylindrical casting having its outer or right-hand end, as seen in Fig. 1, rotatably supported in a bearing 18 formed on the right-hand side wall 19 of the housing. The opposite end of the drum is rotatably supported in an axial bearing seat or opening 20 provided in the worm wheel B, the worm wheel B in turn being rotatably supported by hub portions 21 and 22 at opposite sides thereof rotatable in bearing openings 23 and 24 provided in the left side wall 25 of the housing and the dividing wall 17. As shown, the hub portions 21 and 22 are hollow, the interior opening of the portion 22 being continuous with the cylindrical side wall of the bearing seat 20. The hub portion 21 is of smaller diameter than the hub portion 22 and has the opening of the hollow interior thereof communicating with the bearing seat 20.

The drum A has the usual pair of spaced, perforated, chain-anchoring lugs 26—26 projecting therefrom, to which the end of the chain (not shown) is connected in the usual manner. As will be understood by those skilled in this art, the brake chain leads to and is connected with the brake mechanism proper of the car.

The clutch member C, which normally connects the drum A to the worm wheel B for rotation therewith, comprises a stem 27 having a head 28 at the inner or right-hand end thereof, as seen in Figs. 1, 2, 3, and 10. The stem 27 of the clutch member C has a sliding fit within the hollow hub member 21 of the worm wheel B and is rotatable in unison therewith, being provided with a plurality of lengthwise extending, toothlike ribs 29 engaged in lengthwise extending guide grooves or seats 30 provided in the interior wall of the hollow hub. The head 28 of the clutch member C and the interior wall of the drum A are provided with cooperating clutch teeth 31 and 32. The stem 27 of the clutch member normally projects outwardly beyond the hub 21 of the worm wheel B and the extremity thereof is of conical formation, as indicated at 33, to properly cooperate with the cam means E. The clutch member C is normally held in its engaged position by a spring 133 within the hollow drum A interposed and reacting between the clutch head 28 and the side wall 19 of the housing, the drum being provided with an opening 134 through which the spring extends.

The worm element D is rotatably supported above the worm wheel B with which it meshes and is fixed to a short shaft 34 rotatably supported in suitable bearings 35 and 36 provided in the housing 10. The hand wheel 37, by which the brake mechanism is actuated, is indicated in dotted lines in Fig. 1. As will be understood, the hand wheel 37 is fixed to the outer end of the shaft 34 to rotate the same.

The ratchet wheel F, which actuates the cam means E, is mounted on the shaft 34 inwardly of the worm element D, being fixed to the shaft for rotation therewith.

The clutch-actuating cam means E comprises a wedge-shaped cam block 38, a sliding socket member 39, to which the block 38 is fixed, a spring 40 for moving the cam member in upward direction, and a spring-actuated latch member 41 slidingly mounted in the socket member and cooperating with the ratchet wheel for moving the cam block downwardly against the resistance of the spring 40. The housing section 11 is provided with a narrow guide chamber 42 extending from the left-hand side thereof which communicates with the chamber formed by the section 11. The guide chamber 42 is disposed diagonally, as shown in Fig. 3, and has spaced side walls 43—43. The chamber 42 is closed by a cover plate 44 forming the outer wall of said chamber. The cam block or element 38 and the socket member 39 are slidingly guided within the guide channel formed by the side walls 43—43 and the cover plate 44 and move as a unit. The block 38 is provided with an upstanding cylindrical stem or shank 45, which is secured at its upper end to the socket member 39 by a screw-threaded connection 46. The stem 45 extends through a horizontal wall 47 which divides the guide chamber into upper and lower compartments, this wall being formed partly on the cover plate and partly on the section 11 of the housing and having an opening 48 therethrough adapted to accommodate the stem for upward and downward movement. The spring 40 surrounds the stem 45 and is interposed between the lower side of the socket member 39 and the wall 47. This spring yieldingly opposes downward movement of the cam block 38. The spring-pressed latch member 41, which is in the form of a sliding pawl, is mounted in the opening of the socket member 39 and is yieldingly held in projected position by a spring 49 within the socket bearing on the inner end of the latch member. At the outer end, the latch member 41 has a tooth 50, which engages with the teeth of the ratchet wheel F. The teeth of the ratchet wheel F are designed so that the latch member 41 will ratchet over the same when the ratchet wheel is rotated in clockwise direction, as seen in Fig. 1, and will interlock with the teeth of the same when rotated in a reverse or contraclockwise direction.

The operation of my improved hand brake mechanism is as follows: In tightening the brakes, the chain-winding drum A is rotated by means of the intermeshing worm D and worm wheel B, motion being communicated from the worm wheel to the drum A by the clutch member D. During this action, the latch member idles over the teeth of the ratchet wheel F. The cam block 38 thus remains stationary in substantially the position shown in Fig. 1. To back off the brakes, the worm element D and the ratchet wheel F are rotated in a reverse or contraclockwise direction, as seen in Figs. 1, 2, and 4. During this reverse rotation of the ratchet wheel, the latch member 41 becomes interlocked with one of the teeth of the ratchet wheel, thereby causing the cam block to be forced downwardly, camming the clutch member C out of engagement with the clutch teeth of the drum until complete disengagement from the drum is effected, as seen in Fig. 4. As will be evident, complete disengagement of the clutch member C is not effected until the hand wheel has been rotated to a sufficient extent to move the cam block 38 from the position shown in Fig. 1, through the position shown in Fig. 2 to the position shown in Fig. 4. This permits the brakes being backed off to a certain extent without releasing the clutch, which is highly important in switching operations. Quick and complete release of the brakes is produced by rotation of the hand wheel to an extent to shift the clutch member C to its completely disengaged position, thus freeing the drum and allowing rotation thereof with respect to the driving gearing of the brakes.

After complete release of the brakes when the hand wheel is again rotated in chain-winding direction, initial rotation of the ratchet wheel F permits the cam block 38 to be projected upwardly by the spring 40, thereby withdrawing the block from active camming engagement with the clutch member C. This clutch member C is thus freed to be projected by the spring 133 into operative locking engagement with the clutch teeth of the drum A and driving relation between the worm wheel B and the drum A is again established. During the continued rotation of the hand wheel in tightening the brakes, the operative connection between the ratchet wheel and the latch member 41 is broken, the latter ratcheting over the teeth of the ratchet wheel, as hereinbefore described.

I claim:

1. In a hand brake mechanism, the combination with a rotary chain-winding member; of a rotary driving member; a clutch operatively connecting said winding member and driving member; manually-actuated rotary means operatively connected to said driving member for rotating the same in reverse directions to tighten and release the brakes; a cam member movable in one direction to disengage said clutch; a ratchet wheel fixed to and rotatable with said manually-actuated means in chain-tightening and releasing directions; a latch member on said cam member with which the teeth of the ratchet wheel have shouldered engagement when the ratchet wheel is rotated in brake-releasing direction for moving said cam member in direction to disengage the clutch; and yielding means holding said latch member engaged with the ratchet wheel to permit idling of said latch member when the ratchet wheel is rotated in brake-tightening direction.

2. In a hand brake mechanism, the combination with a rotary chain-winding member; of a rotary driving member; a sliding clutch member operatively connecting said winding member and driving member; manually - actuated rotary means connected to said driving member for rotating the same in reverse directions to tighten and release the brakes; a sliding cam member for disengaging the clutch member from the winding member to permit free rotation of the latter; a ratchet wheel rotatable in unison with said manually-actuated rotary means; and latch means carried by said cam member having latching engagement with said ratchet wheel to actuate said cam member when the ratchet wheel is rotated in brake-releasing direction.

3. In a hand brake mechanism, the combination with a rotary chain-winding member; of a rotary driving member; a reciprocating clutch operatively connecting said winding and driving members; manually-actuated means operatively connected to said driving member for rotating the same in reverse directions; cam means for moving said clutch in one direction to release the same; and latch means operatively connecting said cam means and manually-actuated means for actuating said cam means upon rotation of said manually-actuated means in brake-releasing direction.

4. In a hand brake mechanism, the combination with a rotary chain-winding member; of a driving member; a clutch operatively connecting said winding and driving members; means operatively connected to said driving member for rotating the same in reverse directions to tighten and release the brakes; a movable member for shifting said clutch to disengaged position; a ratchet wheel rotatable in unison with said means for rotating the driving member; and means on said movable member having latching engagement with said ratchet wheel for actuating the movable member to shift the clutch to disengaged position.

5. In a hand brake mechanism, the combination with a rotary chain-winding member; of a rotary driving member; a sliding clutch member operatively connecting said winding and driving members; rotary means for rotating said driving member; a ratchet wheel rotatable with said means; a sliding cam member engageable with said clutch member for shifting the latter to disengaged position; and means on said cam member having latching engagement with the ratchet wheel to transmit motion from said ratchet wheel to the cam member to actuate the latter when said ratchet wheel is rotated in brake-releasing direction.

6. In a hand brake mechanism, the combination with a rotary chain-winding member; of a rotary driving member coaxial with said winding member; a clutch member slidable axially of and operatively connecting said driving and winding members; a sliding cam member for wedging said clutch member to disengaged position; rotary means for rotating said driving member in reverse directions; a ratchet wheel rotatable in unison with said rotary means; and a latch member on said cam member having latching engagement with the ratchet wheel to transmit sliding motion to said cam member when the ratchet wheel is rotated in brake-releasing direction.

7. In a hand brake mechanism, the combination with a rotary chain-winding member; of a rotary driving member coaxial with said winding member; a clutch member slidable axially of and operatively connecting said driving and winding members; a sliding cam member for wedging said clutch member to disengaged position; rotary means for rotating said driving member in reverse directions; a ratchet wheel rotatable in unison with said rotary means; and a spring-pressed latch member on said cam member having locking engagement with said ratchet wheel to transmit motion to said cam member to actuate the same when the ratchet wheel is rotated in brake-tightening direction.

8. In a hand brake mechanism, the combination with a rotary chain-winding member; of a rotary driving member coaxial with said winding member; a clutch member slidable axially of and operatively connecting said driving and winding members; a sliding cam member for wedging said clutch member to disengaged position; rotary means for rotating said driving member in reverse directions; a ratchet wheel rotatable in unison with said rotary means; and a sliding, spring-pressed latch pawl on said cam member having latching engagement with the ratchet wheel, when rotated in brake-releasing direction, to transmit motion to said cam member to actuate the same to disengage the clutch member.

9. In a hand brake mechanism, the combination with a rotary chain-winding member; of a rotary driving member; a sliding clutch element operatively connecting said winding and driving members; manually-actuated rotary means for rotating said driving member; a ratchet wheel rotatable in unison with said manually-actuated means; a reciprocating cam member having camming engagement with said clutch element to disengage the same; a spring for moving said cam member in one direction; and means for effecting movement of said cam member in a reverse direction comprising a latch member on said cam member having latching engagement with said ratchet wheel.

10. In a hand brake mechanism, the combination with a rotary chain-winding member; of a rotary worm wheel; a reciprocating clutch element operatively connecting said winding member and worm wheel; a manually-actuated rotary worm element meshing with the worm wheel; a ratchet wheel rotatable with the worm wheel; a sliding cam member engaging said clutch element; and latch means on said cam member engaging with said ratchet wheel to latch the cam member to said ratchet wheel when the latter is rotated in brake-releasing direction to effect sliding movement of the cam member to disengage said clutch element.

11. In a hand brake mechanism, the combination with a rotary chain-winding member; of a rotary worm wheel; a reciprocating clutch member operatively connecting said winding member to said worm wheel for rotation therewith; a rotary worm meshing with the worm wheel for rotating the latter; a ratchet wheel rotatable in unison with the worm; a reversely sliding member having camming engagement with the clutch member to move the same to disengaged position; spring means for sliding said sliding member in one direction; and means for sliding the same in a reverse direction to wedge said clutch member out of operative engagement, comprising a sliding, spring-pressed, latching pawl on said sliding member having idling ratcheting engagement with said ratchet wheel when the ratchet wheel is rotated in brake-tightening direction and having locking engagement with said ratchet wheel when the same is rotated in brake-releasing direction.

12. In a hand brake mechanism, the combination with a rotary, chain-winding drum having internal clutch teeth; of a worm wheel coaxial with said drum; a sliding clutch element rotatable with said worm wheel and having clutch teeth engageable with the clutch teeth of the drum to lock the drum to said worm wheel for rotation therewith, said clutch element having a stem projecting outwardly of said worm wheel; a slide having a wedge-shaped cam head engageable with said stem to slide the clutch element to disengaged position; a spring yieldingly resisting movement of said slide toward said stem; a rotary worm element meshing with the worm wheel; means for rotating said worm element in reverse directions; a ratchet wheel rotatable in unison with said worm element; and a sliding, spring-pressed pawl on said slide having ratcheting engagement with said wheel when the latter is rotated in one direction and having latching engagement with said wheel when rotated in a reverse direction.

KEITH WILLIAMS.

REFERENCES CITED

The following references are of record in the file of this patent:

UNITED STATES PATENTS

| Number | Name | Date |
| --- | --- | --- |
| 1,909,952 | Haseltine | May 23, 1933 |
| 1,928,027 | Olander | Sept. 26, 1933 |